(12) United States Patent
Kirkham et al.

(10) Patent No.: US 10,661,957 B2
(45) Date of Patent: May 26, 2020

(54) TOOL KITS

(71) Applicant: READYMAN, LLC, Henderson, NV (US)

(72) Inventors: Jeffrey B. Kirkham, Sandy, UT (US); Evan Hafer, Salt Lake City, UT (US)

(73) Assignee: READYMAN, LLC, Salt Lake City, UT (US)

( * ) Notice: Subject to any disclaimer, the term of this patent is extended or adjusted under 35 U.S.C. 154(b) by 650 days.

(21) Appl. No.: 15/088,942

(22) Filed: Apr. 1, 2016

(65) Prior Publication Data

US 2016/0288972 A1    Oct. 6, 2016

Related U.S. Application Data

(60) Provisional application No. 62/141,575, filed on Apr. 1, 2015, provisional application No. 62/235,290, filed on Sep. 30, 2015, provisional application No. 62/315,906, filed on Mar. 31, 2016.

(51) Int. Cl.
*B65D 73/00* (2006.01)
*A01K 97/06* (2006.01)
*B25H 3/00* (2006.01)

(52) U.S. Cl.
CPC ......... *B65D 73/0035* (2013.01); *A01K 97/06* (2013.01); *B25H 3/006* (2013.01)

(58) Field of Classification Search
USPC .......... 206/234, 372, 373; 30/344, 122, 144, 30/142, 123; 7/106, 170
See application file for complete search history.

(56) References Cited

U.S. PATENT DOCUMENTS

| | | | | |
|---|---|---|---|---|
| D127,729 S | * | 6/1941 | Tonelli ............... | B25F 1/00 30/142 |
| 3,136,416 A | * | 6/1964 | Goldrosen ......... | B65D 73/0021 206/372 |
| 3,461,469 A | * | 8/1969 | Morrision ............ | B25F 1/00 150/132 |
| 3,586,161 A | * | 6/1971 | Fong ................... | A47G 21/04 206/372 |
| 4,153,162 A | * | 5/1979 | Samsing ............ | B65D 73/0085 206/372 |
| 5,161,691 A | * | 11/1992 | Vulliez ............... | A47G 21/02 206/542 |
| 5,283,920 A | * | 2/1994 | Plummer ............ | A01K 97/00 43/4 |
| 5,620,090 A | * | 4/1997 | Beeley ............... | B25B 13/56 206/234 |
| 6,009,584 A | * | 1/2000 | Padden ............... | A46B 7/023 15/201 |

(Continued)

OTHER PUBLICATIONS

Ivana. "Ben Wilson Chair Fix." *Architettura e Design*, Jun. 8, 2007, http://www.architetturaedesign.it/index.php/2007/06/08/chair-fix-ben-wilson-seduta.htm. Accessed May 28, 2015.

(Continued)

*Primary Examiner* — Jacob K Ackun
(74) *Attorney, Agent, or Firm* — Workman Nydegger

(57) ABSTRACT

Tool kits are provided with multiple detachable tool components. The tool kits are formed into a planar card shape with an irregular outer boundary that includes at least part of a profile of one or more of the detachable tool component(s).

9 Claims, 5 Drawing Sheets

(56) References Cited

U.S. PATENT DOCUMENTS

| | | | | |
|---|---|---|---|---|
| 6,076,665 | A * | 6/2000 | Chuang | A45D 29/20 206/214 |
| 6,968,835 | B2 | 11/2005 | Lee | |
| 7,905,021 | B2 * | 3/2011 | Shirazi | A47G 21/06 30/142 |
| 8,162,784 | B1 | 4/2012 | Bellefeuille | |
| 8,782,907 | B2 * | 7/2014 | Chong | A47G 21/06 30/142 |
| 9,003,665 | B2 * | 4/2015 | Pelton | B25F 1/006 30/123 |
| 9,072,283 | B2 * | 7/2015 | Lee | A01K 83/00 |
| 2005/0155618 | A1 | 7/2005 | Lafferty | |
| 2007/0006465 | A1 * | 1/2007 | Lee | A47G 21/02 30/142 |
| 2007/0028452 | A1 * | 2/2007 | LaFauci | B26B 27/005 30/142 |
| 2007/0101576 | A1 | 5/2007 | Green | |
| 2009/0199941 | A1 | 8/2009 | Toner et al. | |
| 2009/0233742 | A1 | 9/2009 | Sanford | |
| 2010/0071216 | A1 * | 3/2010 | Novak | B26B 9/00 30/162 |
| 2012/0110746 | A1 * | 5/2012 | Allard Serrano | A47G 21/06 7/151 |
| 2012/0317819 | A1 * | 12/2012 | Pelton | B25F 1/006 30/144 |
| 2013/0232793 | A1 * | 9/2013 | Fazal | A47G 21/02 30/123 |
| 2014/0033540 | A1 * | 2/2014 | Pinkus | A47G 21/06 30/147 |
| 2015/0240524 | A1 * | 8/2015 | Olroyd | E05B 19/20 81/15.9 |

OTHER PUBLICATIONS

"Ti Credit Card Utility Tool." *JerzeeDevil*, Apr. 9, 2009, http://www.jerzeedevil.com/forums/showthread.php/53621-Ti-credit-card-utility-tool. Accessed May 28, 2015.

"Battle for Skull Pass Night Goblin Sprues." *DakkaDakka*, Jul. 31, 2006, http://www.dakkadakka.com/dakkaforum/posts/list/91837.page. Accessed Jun. 4, 2015.

Shalomnow. "What is the size of a standard credit card?." *Fun Trivia*, Feb. 22, 2009, http://www.funtrivia.com/askft/Question103254.html. Accessed May 28, 2015.

Atkins, Robert Wayne. "How to Make a Primitive Homemade Bow and Arrow." Grandpappy's Hard Times Survival Website, 2006, https://grandpappy.org/wbow.htm. Accessed May 28, 2015.

"Survival Kits." www.steffenkehrle.com, 2005, http://steffenkehrle.com/work/22/survival-kits. Accessed May 28, 2015.

Johnson, Benjamen. "Pocket Painter's Tools." *Toolmonger*, Jul. 13, 2009, http://toolmonger.com/category/85/multi-tools/page/4/. Accessed May 28, 2015.

"Survival Card." *The Awesomer*, Aug. 13, 2009, http://theawesomer.com/survival-card/13451/. Accessed May 28, 2015.

"Tool Logic Survival II Card—Survival Kit Review Part Four." *YouTube*, uploaded by Gear Websites, Feb. 12, 2009, https://www.youtube.com/watch?v=hfnwl9KxXAO. Accessed May 28, 2015.

Bowes, Ken. "Trumpeter, 1/32 Scale." *HyperScale*, Aug. 10, 2008, http://www.hyperscale.com/2008/reviews/kits/trumpeter02270reviewkb_1.htm. Accessed Jun. 4, 2015.

"Your 'Last Hope' Pick-set." *Toool's Blackbag*, Jul. 12, 2008, https://blackbag.tool.nl/?m=200807. Accessed May 28, 2015.

"Uncle Sam's Warbirds." *Popular Mechanics Magazine*, Hearst Magazines, vol. 79, No. 1, Jan. 1943, pp. 31A. Print.

\* cited by examiner

"Saw Kit"

"Wilderness Survival Kit"

"Rifle Cleaning Kit"

"Sew Repair Kit"

"Stove Kit"

TOOL KITS

CROSS-REFERENCE TO RELATED APPLICATIONS

This application claims the benefit of and priority to the following provisional applications: U.S. Provisional Patent Application Ser. No. 62/141,575 filed on Apr. 1, 2015, entitled "TOOL KITS," U.S. Provisional Patent Application Ser. No. 62/235,290 filed on Sep. 30, 2015, entitled "MODULAR WALLET STOVE;" and U.S. Provisional Patent Application Ser. No. 62/315,906 filed on Mar. 31, 2016, entitled "TOOL KITS," all of which are expressly incorporated herein by reference in their entireties.

BACKGROUND

1. The Field of the Invention

The present invention is generally related to tools and, in particular, tool kits having a substantially planar form with detachable/breakaway tool components.

2. The Relevant Technology

Many tools have a substantially three dimensional form, such that they are easy to be handled and manipulated by a user. However, this form factor can limit the portability of certain tools. This can be particularly problematic when there is a need to carry one or more kits of different tools, but the user (e.g., wilderness explorers, hikers, military personnel, etc.) does not want to sacrifice storage space and weight limits that are typically associated with the kits of tools and/or the containers used to contain the kits of tools.

Presently, there are a number of tool kit systems on the market that incorporate some form of a substantially flat form factor. These systems generally include a fixed, rigid perimeter surrounding a rigid planar field. The tools of a particular kit are formed by removing portions of the rigid field within the confines of the fixed perimeter. In this way, the rigid perimeter portion of the tool system functions only to contain the tools themselves and to act merely as an attachment point for the tools.

Other systems have modified the rigid fixed perimeter previously described by altering the exterior profile of the fixed perimeter in a manner that provides function. For instance, rigid fixed perimeters have been modified to include a saw-tooth profile such that even when tools are removed from the interior planar field, the fixed exterior profile remains functional to saw certain materials.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some of the tool kits of the present disclosure are manufactured into a substantially planar form factor that enables the tools to be contained in a portable and accessible form, while significantly reducing space and weight requirements compared to related tools in the industry.

In some embodiments, the tool kits include a substantially rigid and planar card body including an irregular exterior boundary. A plurality of tools are formed and detachably positioned within the exterior boundary. These tools are selectably removable from the portable tool kit in response to forces being applied to the tools.

In some embodiments, the one or more tools are connected to one or more additional tools by tabs or recessed portions of the portable tool kit to facilitate their positioning and selective removal. In at least some kits, the plurality of tools includes a first tool with a profile forming at least a portion of the irregular exterior boundary and a second tool with a profile that is detachably connected to the first tool. When the first tool is detached from the card, the second tool forms a new portion of the irregular exterior boundary of the portable tool kit.

In some embodiments, the profiles of a first and second tool are formed in a saw-tooth configuration with each of each the first and second tools having two opposing sides. The two opposing sides of each of the first and second tools form saw-tooth profiles and the first side of each of the first and second tools has a first tooth pattern that is different than a second tooth pattern of a second side of the first and second tools.

In some embodiments, the first tool includes a scraper and the second tool includes a punch. In some instances, the tool kit further includes a plurality of scrapers and/or punches.

In other embodiments, a tool kit is provided with one or more needles having eyeholes forming a corner portion of the exterior boundary and/or one or more needles with eye-holes forming a substantially linear portion of the exterior boundary.

Some tool kits include a tweezer tool that is selectively detachable and, when detached and folded in half, is capable of performing a tweezing function with opposing ends of the tweezer tool.

Some tool kits may also include one or more button components, each button component including at least attachment two holes located such that, when attached, allow the button components to securing two materials together.

In some embodiments a kit includes a stitch ripping tool formed from a handle end, and a pointed end, the handle end having a flat surface area with an interior mounting hole such that the handle end can be directly manipulated by a user's hand or attached to another component by way of the interior mounting hole. The pointed end having a sharpened point and a sharpened edge such that the pointed end may be inserted under a stitch to cut or otherwise remove the stitch. This stitch ripping tool is also operable as a punch for perforating one or more materials.

In some embodiments, the kit includes one or more threading tools having a handle end and a pointed threading end, the handle end having a flat surface area with an interior mounting hole such that the handle end that is operable to be manipulated by a user's hand and/or by attaching the threading tool to another component by way of the interior mounting hole. At the opposing end, the threading tool includes a sharpened point and an eyehole. Using the tool, a user could thread the eyehole, then insert the pointed end through a surface thereby passing the thread to the other side of the surface by means of the eyehole.

In other embodiments, the kit includes a pair of opposable blade/saw components, that, when used together (such as being attached by a pin through a body portion of the opposable components), form a pair of scissors. The components have a first side and a second side, with the first side being a handle portion, and the second side being a sharpened edge or serrated edge.

In some embodiments, the kit includes a three-pointed trident component having a main flat surface that includes a plurality of mounting holes, and three barb-ended extensions extending perpendicularly from the main flat surface. The mounting holes in the main flat surface allowing a location whereby a user can mount the trident component to a shaft.

In some embodiments, the tool kit includes a plurality of detachable fishing hooks comprising an eyelet end for affixing the hook to a line, and an end with one or more barbed points.

In some embodiments, the tool kit includes a small game snare including a center column running the length of the snare, and two or more pairs of sharpened points extending perpendicularly from the center column. The center column also includes one or more mounting holes for affixing the snare to another surface, tool, or other component of the kit.

In some embodiments, the kit includes a plurality of straight needles with two ends, the first end being a sharpened point, and the second end a broadened surface with an eyelet portion that is removed, or that is removable, so a user can thread the needle.

In some embodiments, the kit includes one or more straps formed by an elongated flat surface with two ends with each end having an attachment hole removed from the flat surface for affixing the strap to another material at at least two points.

In some embodiments, the kit includes a plurality of substantially circular or oval fishing lures having a flat surface with two or more holes removed from the surface for affixing the lures to a line or other threaded material.

In some embodiments, the main portion of the kit forms one side of a stove with at least three sides. The main portion would include at least two pairs of interlocking fingers, with at least one pair of interlocking fingers located on each of two edges that form the exterior boundary of the tool kit. The two edges on which the interlocking fingers are attached are substantially parallel to each other so that the fingers on one portable tool kit can be attached to the complimentary fingers of a second tool kit. Further, three or more of these tool kits with interlocking fingers could be attached to each other in a manner that created a three or more sided stove.

In some embodiments, the kit includes one or more cord cleats.

In some embodiments, the kit includes a removable tinder scraper comprising a flat surface with a flat smooth edge and a rounded serrated or saw/toothed edge.

In some embodiments, the kit includes a fork, skewer, and/or another eating utensil.

Additional features and advantages will be set forth in the description, which follows, and in part will be obvious from the description, or may be learned by the practice of the teachings herein.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

In some disclosed embodiments, tool kits are provided that enable the exterior portions of the tool kits to be used for functional purposes, once they are removed from the card body. In some embodiments, the tool components can also be used prior to their removal from the card(s). Some of the disclosed embodiments improve upon known tool/card systems by allowing portions of the exterior perimeter of the disclosed tool kits to be detachable from the main body portion and to provide utility to the user in both their initial configuration and as separate stand-alone use. Further, the present invention teaches an improvement wherein removal of a portion of the initial exterior perimeter of a planar tool kit creates a new exterior perimeter profile with renewed or alternate utility relative to the utility of the initial exterior perimeter profile. Utilization of the exterior portion of the tool kit can also help maximize layout and make efficient use of space constraints, without requiring a dedicated portion of the card/kit to remain as an unused boundary to the other tools.

In some instances, the tool kits are manufactured into a substantially planar form factor that enables the tools to be contained in a portable and accessible form, while significantly reducing space and weight requirements compared to related tools in the industry. The removably attached tools also allow for the function of the tool kits to be altered or renewed as the user removes and/or disposes of one or more of the detachable tools.

The form factor for some of the disclosed embodiments improve upon existing planar tool kits by forming at least a portion of the exterior perimeter profile from the tool-kit tools themselves such that, when certain tools are detached, the exterior perimeter profile is changed. This improvement aids not only in decreasing wasted material and reducing weight, but in some embodiments also increases the longevity and utility of the tool by allowing for tool redundancy or tool renewal.

Figure 1:
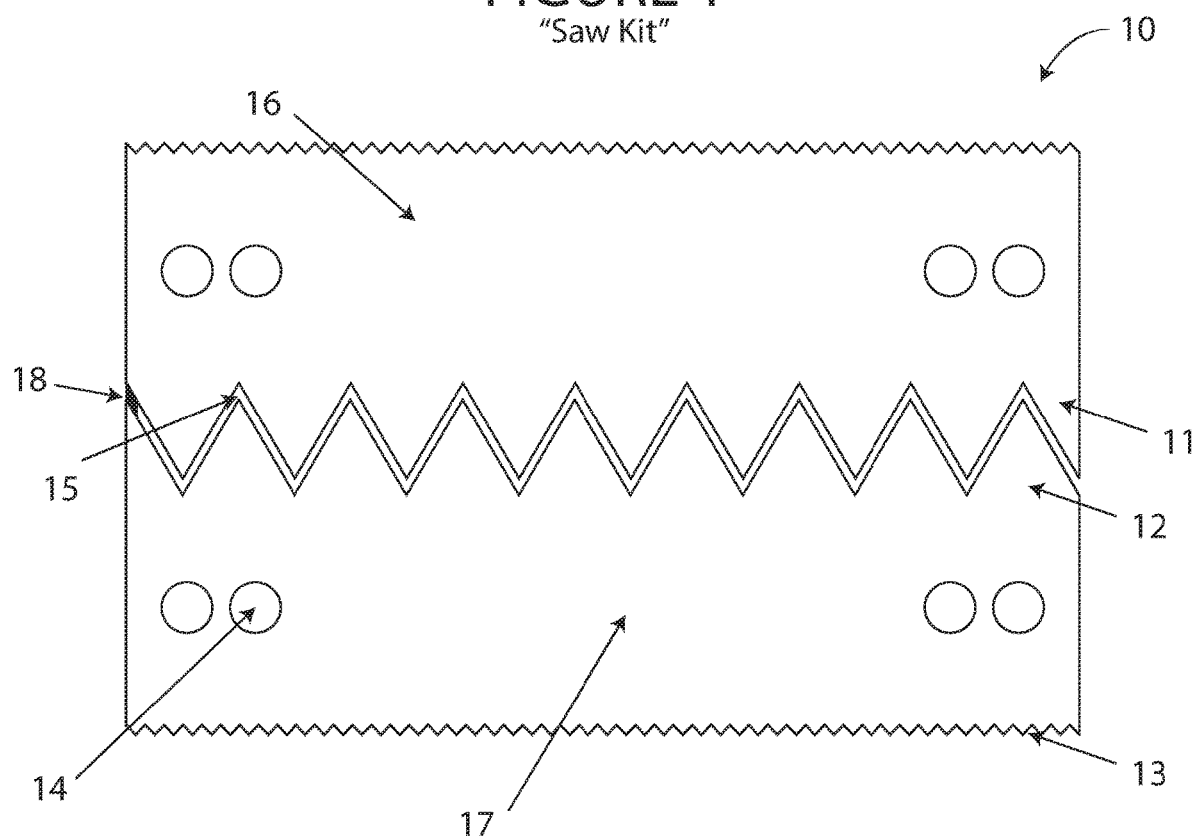
FIG. 1 illustrates one embodiment of planar tool kit that includes detachable saw tools with multiple edge profiles defining portions of the exterior perimeter profile of the kit.

In one embodiment of a planar tool kit, as illustrated in FIG. 1, a substantially planer saw kit 10 includes a pair of similar detachable saws 16 and 17. Saw kit 10 may include a number of cutouts, such as hole 14, to enable a user to better manipulate or attach saw kit 10 to other materials such as by using the cutouts to tie a saw to a stick. Saw blades 16 and 17 may be attached along area/void 15 with one or more breakable tabs (e.g., tab 18) or by any other means suitable to connect blades 16 and 17. Although only one tab 18 is shown, any number of tabs may be incorporated along any portion of the area/void 15. In all other disclosed embodiments, herein, similar tabs may be used to detachably connect the disclosed tool components. Rather than tabs, the tool components can also be connected together by recessed portions of the material between the tool components (without forming a void 15). The recessed portion can be formed, for example, by etching the material and/or stamping the material between the components. Irrespective of how the tool components are connected and/or how the tab/recesses are formed, a user, through physical manipulation of saw portions 16 and 17, can separate the two portions by bending and/or breaking the connection between the two portions/tool components.

In all other disclosed embodiments, herein, similar tabs/recesses are formed between the detachable tool components.

In an embodiment such as FIG. 1, the initial exterior perimeter profile of the saw kit 10 is characterized by a narrow serrated edge 13 on two sides. However, if a user of saw kit 10 separates saws 16 and 17, the exterior perimeter profile of saw kit 10 is changed in a manner that results in one edge of the exterior perimeter profile remaining serrated edge 13 and another edge becoming the larger toothed profile 12. It should be appreciated that while FIG. 1 illustrates two saws 16 and 17, saw kit 10 could be configured with more than two detachable saws. In such an embodiment, a user could repeatedly change the exterior perimeter profile of saw kit 10 by removing additional saws. A user may do this if one saw is damaged or if a different saw-tooth profile would be more beneficial for a particular cutting application.

Figure 2:
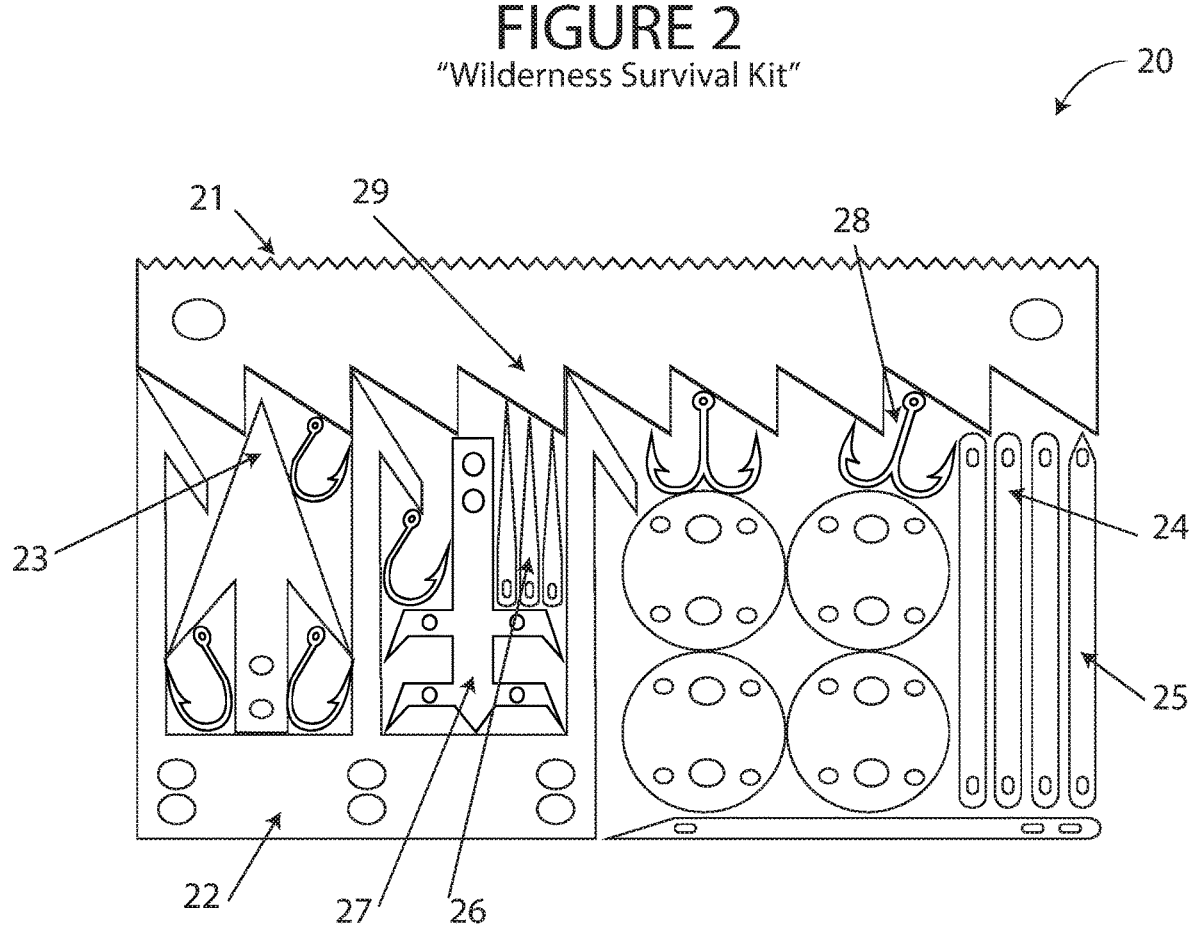
FIG. 2 illustrates one embodiment of a planar tool kit comprising wilderness survival tools including multiple detachable tools with profiles defining portions of the exterior perimeter of the planar card and multiple detachable tools with profiles defined by removed portions of the interior area of the planar card.

FIG. 2 illustrates a different planar tool kit embodiment in the form of a survival tool kit. FIG. 2 includes a survival kit 20 comprising a serrated saw 21 forming one portion of the exterior perimeter of survival kit 20. As shown, serrated saw 21 is removably attached to trident 22, spear tip 23, strap 24, tweezer 25, needle 26, small game snare 27, and fish-hook 28, among other tools. Serrated saw 21 may be removably attached to other components within survival kit 20 either directly or through the use of breakable tabs.

In some embodiments, the tweezer 25 is removed and folded to perform a tweezing function with opposing ends of the tweezer 25. Similarly, the tweezer 25 is also configurable as a cotter pin that can be removed and folded into a working cotter pin.

In such an embodiment, upon removal of serrated saw 21 by a user, the exterior portion of survival kit 21 is modified and the function of the survival kit 20, as a whole, is changed. Here, the removal of serrated saw 21 allows the user access to an alternative wood saw profile 29, as well as to the exterior profile portions of trident 22 and spear tip 23.

It is important to note that, as illustrated by FIG. 2, a portion of the exterior profile of the survival kit 20 has utility for a user both in its initial attached configuration as well as in a secondary detached configuration. Here, the serrated saw 21 is usable in an attached and detached form and wood saw 29 is additionally available to the user when in detached form. It should also be noted that once a portion of survival kit 20 that initially defined a portion of the exterior perimeter is removed, survival kit 20 a secondary exterior profile is created that is operable to provide renewed or alternative utility to the remaining portions of the main body of survival kit 20.

In some embodiments, the planar tool kit is configured in a manner that allows a series of tools to be used in a particular sequence as they are detached and/or disposed of. For instance, in one embodiment, a tool kit includes multiple tools that are useful for completing a particular process (in sequence) like disassembly of a firearm. Initially, such a firearm disassembly kit includes an external profile useful for scraping or otherwise cleaning the exterior of soiled firearm in order to gain access to assembly components like screws/files that are located proximate the scraping components. However, the tools/components are laid out and arranged in the card/tool configuration such that the tools/components that are to be used first are located externally (closer to or including the outer boundary of the planar card body) relative to the tools/components that are used subsequently. For instance, once cleaning has been completed, the initial scraper tool that formed the initial exterior profile is detached and/or discarded by the user subsequently exposing a secondary tool like a screwdriver. Because the screwdriver tool is still attached to the main body, a user may have a mechanical advantage in using the tool over a tool that must be detached prior to use. Again, once the user has complete use of the secondary tool, it is detachable subsequently exposing the exterior profile of tertiary tool such as a pin displacement tool. In this manner, a single planar tool kit could be utilized for completion a specialized sequential task.

Figure 3:
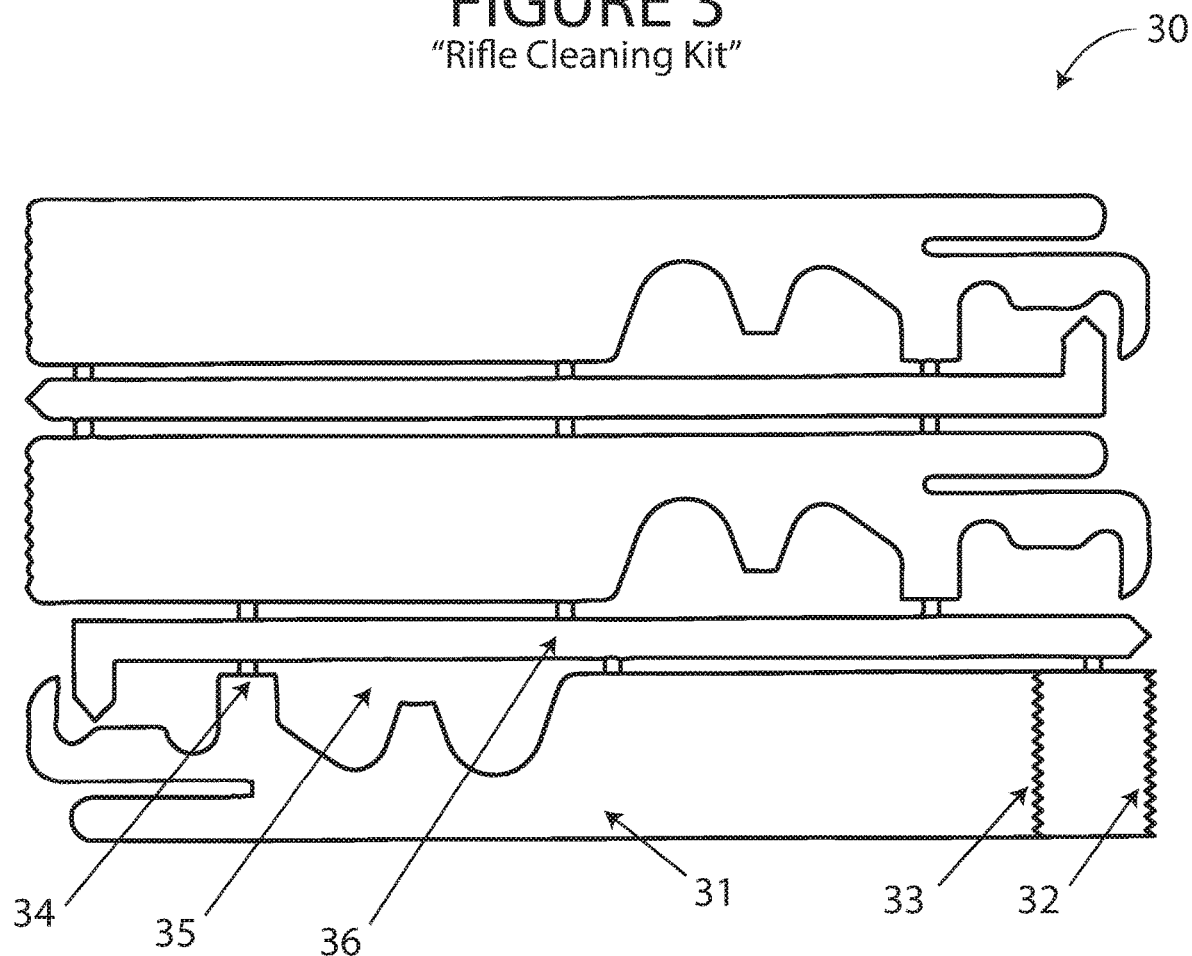
FIG. 3 illustrates one embodiment of a planar tool kit comprising a rifle cleaning kit having portions of the initial perimeter profile detachable in a matter that, once detached, creates a functional secondary perimeter profile.

Referring now to FIG. 3, a planar tool kit is shown including a rifle cleaning kit 30. Cleaning kit 30 includes a multi-scraper tool 31 with a detachable serrated edge 32. Detachable serrated edge 32 may be attached to multi-scraper tool 31 either directly or by breakable tabs. In the event that a user dulls or otherwise damages serrated edge 32 in the course of using the multi-scraper tool 31, the user may detach serrated edge 32 exposing a fresh serrated edge 33. It should be noted that serrated edges 32 and 33 may be utilized by a user whether or not multi-scraper 31 is attached or detached from cleaning kit 30. Further, in contrast to prior planar tool kit systems, the present invention creates improved utility by allowing the exterior perimeter profile of cleaning kit 30 to be modified through removal of used or damaged portions of the initial exterior perimeter profile. In this case, serrated edge 32 forms the initial perimeter profile of cleaning kit 30. Upon detachment by a user, serrated edge 33 defines a new exterior perimeter profile with renewed utility.

In some embodiments, as shown, the rifle cleaning kit 30 is configured with a punch 36, which is operable to punch a hole and to clean holes in a rifle.

Notably, some embodiments of the rifle cleaning kit 30 include a plurality of different multi-scraper tool 31 components and a plurality of punches 36.

It should be appreciated that in the present invention, the utility of the initial exterior perimeter and any subsequent exterior perimeter created by detachment need not be the same or even substantially similar. Thus, while this particular embodiment illustrates a substantially similar renewal of function upon detachment of a portion of the initial exterior perimeter, serrated edge 33 may be configured to have a different saw-tooth profile (i.e., a greater or fewer number of teeth per inch) than serrated edge 32 or even provide an entirely different function than serrated edge 32.

Figure 4:
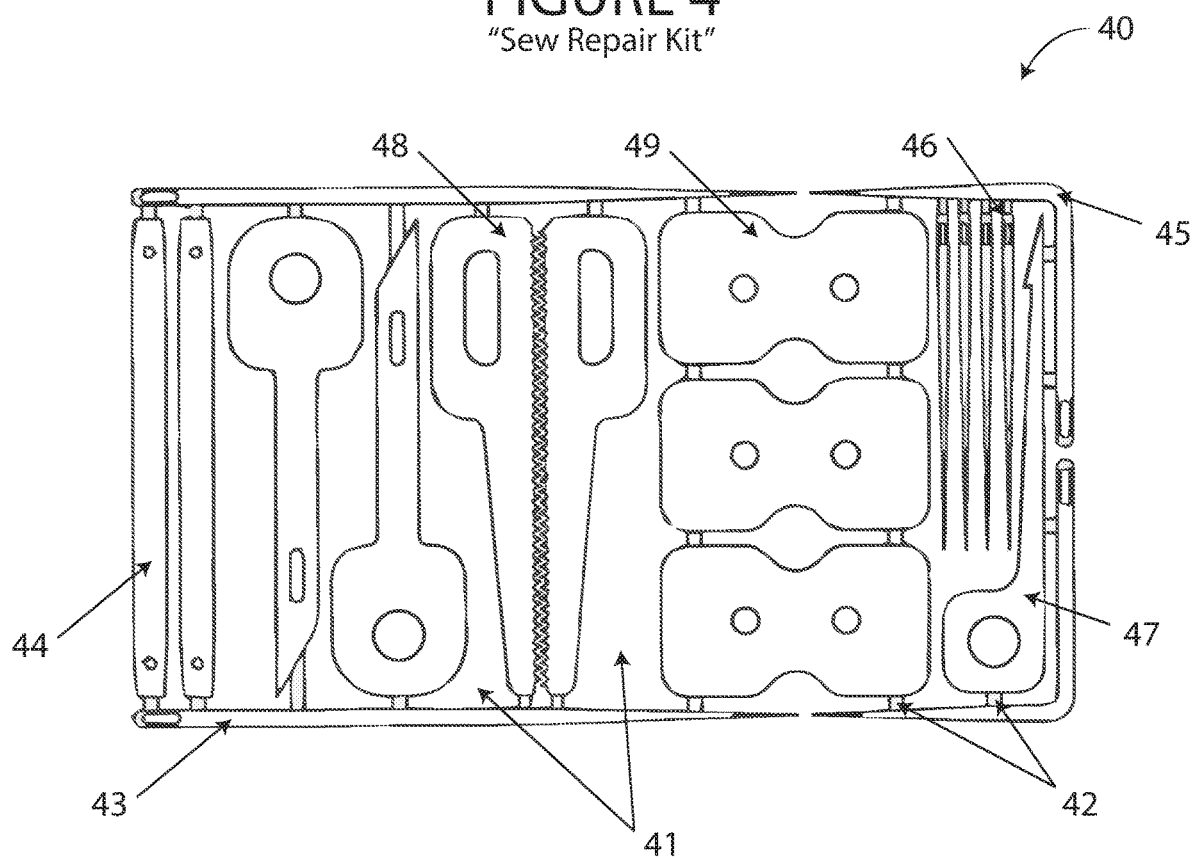
FIG. 4 illustrates one embodiment of a planar tool kit comprising a sewing repair kit including multiple detachable tools with profiles defining the initial exterior perimeter of a portion of the planar tool kit.

FIG. 4 illustrates an embodiment of a planar tool kit in the form of sew repair kit 40. Sew repair kit 40 includes a series of tools including straight sewing needle 43, straps 44, curved sewing needle 45, scissors 48, and buttons 49. Profiles of the aforementioned tools are created by voids 41 indicative of material being removed or omitted from the planar card as part of the manufacturing process. The tools within sew repair kit 40 are held in place by breakable tabs 42.

Sew repair kit 40 illustrates a planar tool kit having an initial exterior perimeter defined by the tools of the repair kit itself. Rather than utilizing a perimeter structure with the primary function of containing the kit's tools, this embodiment incorporates the tools themselves into the structure. In this manner, the kit can include additional tools, reduce overall weight, reduce waste, and/or modify the utility of the kit as a whole.

In some embodiments, the tool kits have a planar form that is defined by a substantially rectangular shape. In some instances, the tool kits have the general appearance and shape of a card, with similar dimensions to typical credit cards that can be fit into a pocket of a wallet or a user's clothing (e.g., about 2 inches in width by about 3.5 inches in length).

In many instances, the width of the tool kit is between about one inch and about 3 inches, while the length is between about 2 inches and 5 inches. In other instances, the size dimensions of the tool kit will exceed the width and length of a typical credit card. For instance, the tool kit can have dimensions that exceed several inches in length and/or width (e.g., greater than 3 inches, greater than 4 inches, greater than 5 inches, greater than 8 inches, greater than 12 inches, etc.).

The width and length of the tool kit can also be less than about 1 inch in width and less than about 2 inches in length, particularly when the tool kit is configured for use with identification badges (e.g., dog tags) and/or jewelry (e.g., bracelets, pendants, etc.)

The thickness of the tool kit is preferably less than about 0.125 inches and, preferably less than about 20 mm. In many instances, the tool kit has a thickness of less than 10 mm. In one instance, for example, the tool kit has a thickness of about 5 mm The tool kit can be manufactured out of a metal (e.g., aluminum, copper, steel and/or any metal alloy), plastic (e.g., polyethylene (PE, HDPE, LDPE), polypropylene (PP) and polyvinyl chloride (PVC), nylon, polytetrafluoroethylene (Teflon), other thermoset plastics or thermoplastics, military grade plastics, Kydex and/or any other plastic material), and/or ceramic material.

In some instances, the tool kit and all of the attached components are manufactured out of a single material. In other embodiments, one or more of the tool kit components are manufactured out of a different material than one or more of the other tool kit components or holding frame of the tool kit.

When manufactured out of different materials, the tool kit components can be attached by a welding process, a laminate backing that overlaps two or more of the tool kit components, by an adhesive and/or by any other attachment mechanism.

In many embodiments, the tool kit includes tool components that are positioned along an edge of the tool kit, defining an edge of the tool kit (which can eliminate or reduce an amount of wasted material required for a holding frame). For instance, each of the illustrated tool kits includes one or more tool components that form a part of an outer edge of the tool kit.

In some instances, the tool kit includes tool components that must be assembled or manipulated after being removed from the tool kit before forming a desired tool. By way of example, the spear point and multi spear points tool kits of can include multiple spear blades that are detachable from the tool kit and which can be assembled to form a single assembled spear tip when attached to a shaft, for instance.

Another feature that is evident in many of the tool kits of the present disclosure is the manner in which the tool components are held together while still maintaining open space between different portions/edges of the tool components. In particular, some of the tool components are only held together by small attachment points between the tool components, with open space between the remaining portions of the tool components. However, it will be appreciated that any of the regions between the illustrated tool components can comprise open spaces (even if not specifically called out). The open space is beneficial for eliminating waste of material during manufacturing and by helping to reduce the overall weight of the tool kit.

To protect a user from sharp edges, the tool kit can be laminated by one or more thin plastic cover(s) on one or both sides of the kit(s) and/or the kit(s) can be contained in plastic envelopes/sheaths.

A laminate cover can be a simple one sided tape material or a sprayed laminate.

A plastic envelope can be useful for holding tool components that have been detached. Although not shown, the envelope/sheath can be sized and shaped to snuggly fit around the tool kit (with or without a flap to help retain the tool kit within the envelope. Preferably, the envelope is a transparent and thin plastic, although paper envelopes can also be used. The envelope/laminate covering can also be configured to the shape of the tool kit, such as when the tool kit includes a dog tag or other identification object, jewelry or other non-rectangular tool kit form factors.

Other form factors for the tool kit components include credit cards (which have an operational magnetic strip or readable chip), invitations, dog tags, ID tags, coasters, key chains, bookmarks, and so forth.

Edges between tool components can comprise serrated or sharpened edges, such as between the spear points or any of the other tool components. The serrated or sharpened (tapered) edges can be formed by a stamping manufacturing process, as well as by chemical etching or any other suitable manufacturing process.

In some instances, at least some of the tool components are attached to other tool components by thin attachment points or segments. These attachment points/segments are defined by a thickness that is less than a thickness of the tool components.

While the different tool components and their use should be self-evident to those of skill in the art, specific attention will be provided for a few of the tool kit components to provide examples of use.

The sew repair kit of includes needles that can be removed and used to thread a strand of material by placing an end of the strand through an eye (hole) of the needle. The sew repair kit also includes button structures that can be used to attach the button structures to a material by threading a string or other stranded material through the holes in the button and the material.

The spear tip kits include spear blades that can be removed and fastened to a shaft by passing a pin or cord through the holes formed in the spear blades. The saw tool components can also be fastened to a handle in like manner.

Figure 5:
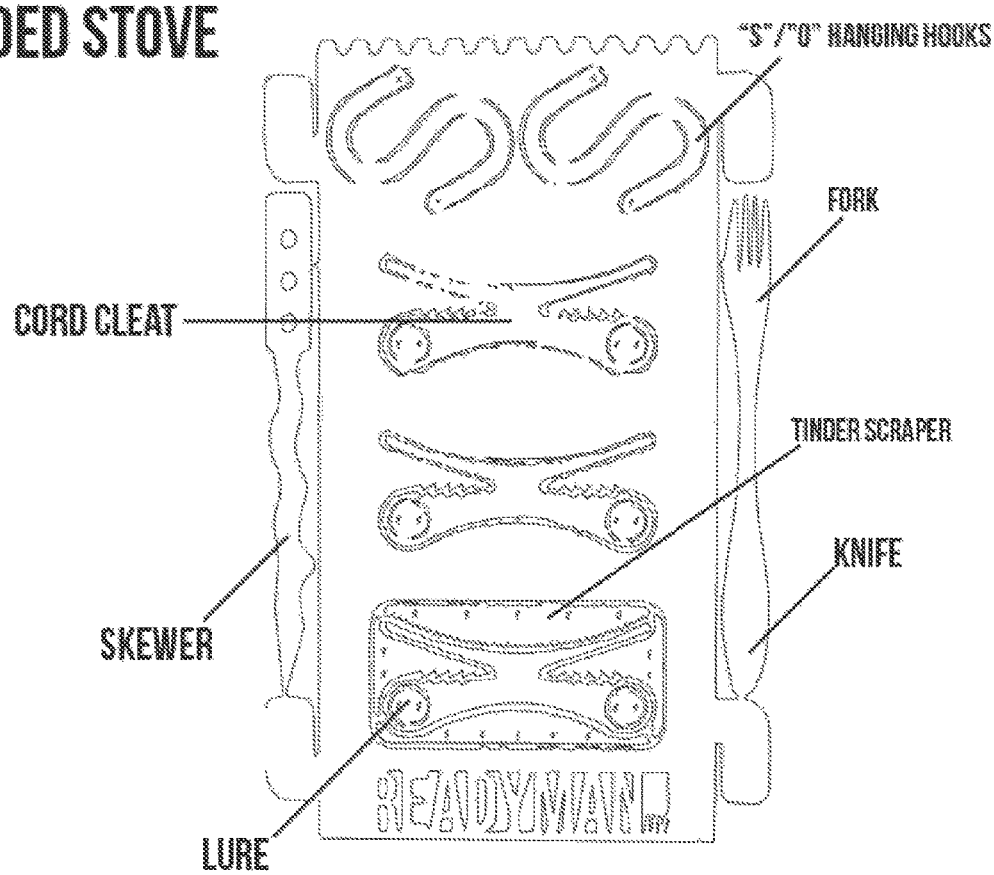
FIG. 5 illustrates one embodiment of a tool kit that is operable to form a stove with one or more corresponding and/or similar tool kits.

Attention is now directed to the tool kit shown in FIG. 5, which includes an irregular edged tool that can operate as a sidewall support for a stove when two or more of the wall components are linked together, such as by linking arms A1 and A2 into arms B1 and B2. The air holes can include openings and/or tool components that are detachable from the wall such as the cord cleats, lures (forming removable circular pieces from the cord cleat holes), and tinder scraper (which also includes a serrated edge that is operable as a saw/knife).

One or more fuel pockets are formed into the sidewall of the stove, once the inner tool components are removed, such as the tinder scraper and cleats. Three or more of the stove tool kits are connectable to form an interconnected stove (e.g., by linking the arms of opposing stove tool kits. This fuel pocket window (positioned inside of the sidewall or along a bottom edge of the sidewall) can include serrated edges to operate as a knife or other tool (when removed).

It will be appreciated that any combination of the foregoing features can be combined into one or more of the different tool kit(s), having any footprint shape (e.g., rectangular, triangular, circular, oval, etc.), having a substantially planar form and substantially any width/length, formed out of one or more materials, covered or uncovered, with sharpened/serrated edges, unsharpened edges, open spaces between tool components, with one or more tool components contained within outer edges of the tool kit(s), with one or more tool components positioned along and including/defining edges of the tool kit(s), and/or any of the other foregoing features described herein.

These tool kits can provide advantages over other systems, such as survival tool described in U.S. Pat. No. 8,162,784. In particular, the present tool kits can be formed to omit wasted space and excess weight present in the systems described in U.S. Pat. No. 8,162,784, by inserting the tool components more closely and by leaving more open space than in the '784 patent. The '784 also fails to utilize outer edges of the tool kit as part of the tool kit components. The '784 patent also fails to disclose many of the tool components and kit configurations that are described in this application, including the rifle repair kit, sewing kit, saw kit, escape kit, and other kits shown and described herein.

The present invention may be embodied in other specific forms without departing from its spirit or essential characteristics. For instance, it will be appreciated that the tool kits can also include other tool components that are not specifically called out or illustrated, including hair clips, paper clips, binder clips, staples, and so forth. The described embodiments are, therefore, to be considered in all respects only as illustrative and not restrictive. The scope of the invention is generally reflected by the appended claims rather than by the foregoing description. All changes which come within the meaning and range of equivalency of the claims are to be embraced within their scope.

What is claimed is:

1. A portable tool kit comprising:
   a substantially rigid and planar card body including a plurality of tools that are removable from the portable tool kit, the plurality of tools including:
   a serrated saw, the serrated saw forming one portion of an exterior perimeter of the portable tool kit, wherein the serrated saw comprises two opposing sides, a first side of the two opposing sides having a first saw-tooth profile and forming the exterior perimeter of the portable tool kit, and a second side of the two opposing sides having a second saw-tooth profile comprising teeth that are different in size than teeth of the first saw-tooth profile;
   a trident, wherein portions of the second saw-tooth profile of the serrated saw are removably attached to the trident; and
   a fishing hook, wherein different portions of the second saw-tooth profile of the serrated saw are removably attached to the fishing hook, wherein the fishing hook comprises an eyelet, and wherein the eyelet is positioned entirely within a space defined by two teeth of the second saw-tooth profile.

2. The portable tool kit of claim 1, wherein the kit includes a tweezer tool that is detachable and, when folded in half, is operable to perform a tweezing function with opposing ends of the tweezer tool.

3. The portable tool kit of claim 1, wherein the trident comprises a main flat surface including a plurality of mounting holes, and three barb ended extensions extending perpendicularly from the main flat surface.

4. The portable tool kit of claim 1, wherein the fishing hook includes two barbed points.

5. The portable tool kit of claim 1, wherein the portable tool kit includes a small game snare, the small game snare comprising a center column running a length of the small game snare, and two or more pairs of sharpened points extending perpendicularly from the center column, the center column also including one or more mounting holes.

6. The portable tool kit of claim 1, wherein the portable tool kit includes a plurality of straight needles, each straight needle in the plurality of straight needles including two opposing ends, a first end being a sharpened point, and a second end being a broadened surface with an eyelet portion removed from the broadened surface.

7. The portable tool kit of claim 1, wherein the portable tool kit includes one or more straps, each one of said one or more straps comprising an elongated flat surface with two ends, each end having an attachment hole removed from the elongated flat surface.

8. The portable tool kit of claim 1, wherein the portable tool kit includes a plurality of substantially circular fishing lures, each fishing lure in the plurality of substantially circular fishing lures comprising a flat surface with two or more holes removed from the flat surface.

9. A portable tool kit, comprising:
   a substantially rigid and planar card body comprising a plurality of tools, the plurality of tools comprising:
   a serrated saw, the serrated saw forming one portion of an exterior perimeter of the portable tool kit, wherein the serrated saw comprises two opposing sides, a first side of the two opposing sides having a first saw-tooth profile and forming the exterior perimeter of the portable tool kit, and a second side of the two opposing sides having a second saw-tooth profile comprising teeth that are different in size than teeth of the first saw-tooth profile; and
   a fishing hook, wherein the fishing hook comprises an eyelet, and wherein the eyelet is positioned entirely within a space defined by two teeth of the second saw-tooth profile.

* * * * *

UNITED STATES PATENT AND TRADEMARK OFFICE
CERTIFICATE OF CORRECTION

PATENT NO. : 10,661,957 B2
APPLICATION NO. : 15/088942
DATED : May 26, 2020
INVENTOR(S) : Kirkham et al.

Page 1 of 1

It is certified that error appears in the above-identified patent and that said Letters Patent is hereby corrected as shown below:

In the Specification

Column 2
Line 37, change "attachment two" to –two attachment–

Column 4
Line 33, change "as separate" to –as a separate–

Column 5
Line 62, "20 a" to –20 with a–

Column 6
Line 25, change "completion a" to –completion of a–

Column 8
Line 24, change "snuggly" to –snugly–

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*